Patented Jan. 16, 1940

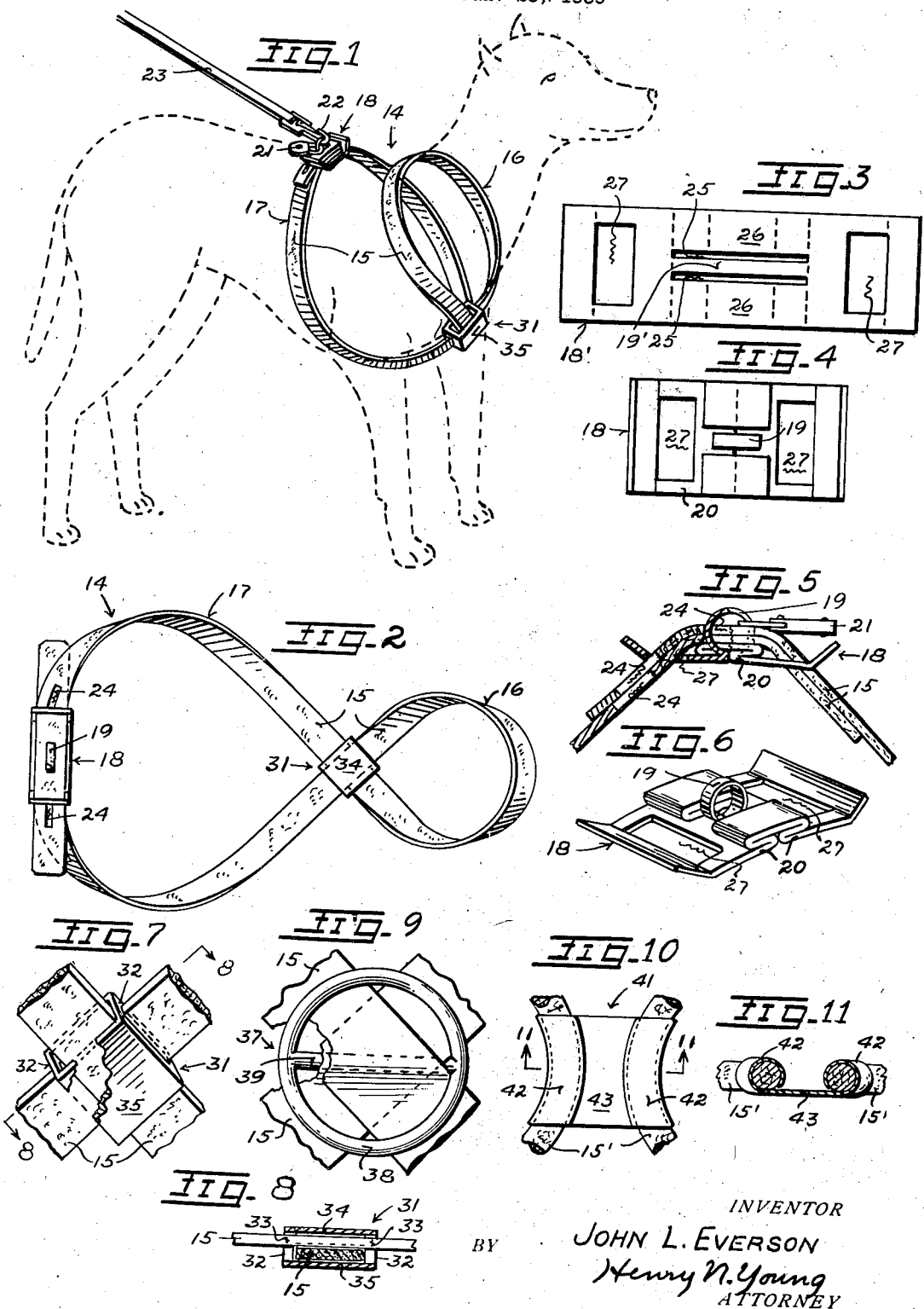

2,187,021

UNITED STATES PATENT OFFICE 2,187,021

ANIMAL HARNESS

John L. Everson, Oakland, Calif.

Application January 23, 1939, Serial No. 252,368

8 Claims. (Cl. 119—96)

The invention relates to a decorative and controlling harness for dogs and other quadrupeds.

An object of the invention is to provide a particularly simple harness whereof the strap portion comprises a single uniform strip of flexible material to provide mutually attached collar and body loops.

Another object is to provide a harness of the type described wherein but a single fastening means is required to secure it on an animal, and that at an upper point of a said loop.

A further object is to provide a harness structure which is of adjustable size and, after its mounting on an animal, is normally self-adjusting to most comfortably fit the animal.

Yet another object is to provide an improved harness which is adapted for such controlling use, with or without a leash, that an appropriate pull thereon is arranged to cause an effective and distributed action of the harness on the animal carrying it.

Added objects are to provide improved buckle and spreader elements for the specific harness assembly.

The invention possesses other objects and features of advantage, some of which with the foregoing will be set forth or be apparent from the following description thereof, and in the accompanying drawing, in which, Figure 1 is a perspective view of the harness as mounted on a dog, a leash being attached to the harness in operative relation thereto.

Figure 2 is a plan view of the harness in dismounted and opened-out condition.

Figure 3 is a face view of a blank for forming a buckle element of the harness assembly.

Figure 4 is a plan view of the formed buckle element.

Figure 5 is a partially section edge view of the buckle element in operative relation to the ends of a flat strap which provides the banding portion of the harness.

Figure 6 is a perspective view of the buckle element.

Figure 7 is a perspective view showing the relation of a spreader element of the harness assembly to strap portions engaged by it.

Figure 8 is a sectional view at 8—8 in Figure 7.

Figure 9 is a flat face view of an alternative spreader element in operative association with strap portions thereat.

Figure 10 is a face view of still another spreader structure in operative association with a strap of rounded cross-section.

Figure 11 is a section at 11—11 in Figure 10.

As is particularly illustrated in Figures 1 to 8, the features of my invention are embodied in a harness 14 which essentially comprises a single flat and uniform strap 15 of flexible material such as leather or webbing shaped to provide loops 16 and 17 extending from a common point at which strap portions are mutually crossed in flat engagement. The ends of the strap are releasably secured together in mutually overlapped relation by means of a suitable fastener or buckle 18. For reasons to be hereinafter brought out, the connection for the strap ends is preferably positioned at the part of a loop furthest from the common loop point; as shown, the buckle 18 is so provided with respect to the loop 17.

The present harness is designed for its mounting on an animal to have one loop disposed as a neck collar, the other loop disposed around the body behind the front legs of the animal, and the common juncture point of the loops disposed generally opposite the animal's breast, whereby to dispose the buckle 18 above the line of the animal's spine. In the present instance, the loops 16 and 17 respectively function as collar and body loops, and the buckle 18 is disposed at the top of the loop 17. The strap portions at the common junction point of the loops are not attached to each other, and when the strap extremities are fixed together in such adjustably overlapped relation as best fits the harness to an animal and makes a continuous element of the strap, the conformation of the animal alone determines the position of said junction point of the loops in the harness.

Recalling the fact that some animals must be held back and that others must be led forward while under human control, it will be noted that a person may restrain the forward movement of an animal wearing the present harness by pulling rearwardly of the animal at the top of either loop to tighten the other loop about the portion of the animal engaged by it, and so restrain the animal against forward progress. If a rearward pull is exerted at the top of the body loop 17, the resulting tight engagement of the collar loop about the animal's neck will tend to pull its head down while pulling the loop juncture point rearwardly between the animal's front legs. Either a rearward or forward pull on the neck loop 16 will tighten the loop 17 about the body while pulling down on the back and upwardly against the breast. In either case, sufficient control may be provided by exerting an appropriate pull, since the animal will stop or move as may be required to relieve the discomfort caused by the tightened loop.

It will now be noted that the present buckle 18 has its tongue 19 in the form of an eye which extends rigidly from a base portion 20 beyond the lapped strap ends which it engages for receiving the bolt of a padlock 21 and/or the snap hook 22 of a leash 23 by which the animal may be controlled from a distance. To provide for the adjustment of the effective length of the harness strap 15 as a banding element for animals of different size, or the same animal as it grows larger, both end portions of the strap are preferably provided with a plurality of spaced slots 24 which may selectively receive the buckle tongue 19 in various combinations with respect to the slots of the different strap ends, and so provide for a maximum length adjustability with a given length of strap.

The disclosed buckle structure is provided by suitably shaping a single rectangular blank 18' comprising a plate of sheet material which is punched to provide a pair of longitudinal slits 25 intermediately therein and defining a relatively narrow plate portion 19' between them. Plate portions 26 are defined between the slits 25 and the side edges of the plate 18', and rectangular openings 27 are provided in the plate beyond the ends of the slots 25.

The buckle 18 is shaped from the blank 18' by bringing the plate portions beyond the slots 25 laterally together at cross lines at the opposite ends of the portions 19' and 26 to jointly provide the buckle base 20 while simultaneously offsetting said portions upwardly from and between said cross lines. The offset portion 19' is formed as an open loop comprising the tongue 19, while intermediate parts of the portions 26 are flattened down against doubled-back end parts of the portions to provide a rigid connection between the plate portions which provide the buckle base, end parts of the base being turned angularly upwardly at the outer lines of the openings 27 to complete the shaping of the buckle to have the form shown in Figures 5 and 6.

The buckle 18 is utilized by passing one end of the strap 15 upwardly through an opening 27 of the buckle base and downwardly through the other opening 27 with the tongue registering in a strap slot 24. The other strap end is installed over the first in the same manner but in oppositely directed position. The application of the padlock bolt and/or leash hook through the eye of the tongue 18 above the lapped strap ends prevents an accidental release of the strap ends from the buckle. It will be understood that the under side of the buckle base and the strap end portions extending thereat are preferably in such angular relation that the combination may normally fit the top portion of an animal's back more or less in the manner of a saddle.

Means are preferably provided for so engaging the strap portions at the meeting point of the loops 16 and 17 as to insure a symmetrical form for the mounted harness, while preventing either of the lower portions of the strap from depending unduly far beneath the animal's body. As shown in Figures 1 and 2 and 7 and 8, a member 31 is provided at the juncture of the harness loops and receives the strap portions therethrough in mutually crossed relation in such a manner that the engaged strap portions are held against lateral separation while freely slidable in the member independently of each other, said member comprising a sliding keeper or spreader. Except possibly during the application of the described controlling pull on a loop 16 or 17, the continuous strap of the harness may adjust itself through the member 31 while the latter member functions for maintaining the symmetry of the harness.

The member 31 of Figures 1 and 2 and 7 and 8 comprises a one-piece tubular element of rectangular cross-section and having opposite sides 32 thereof provided with slots 33 adjacent and parallel to the same third side 34. One portion of the strap 15 is extended through the slots 33 and across the bore of the member 31, while the other strap portion thereat extends longitudinally through the bore of the member between the front strap portion and the fourth side 35 of the member. It will be noted that the present spreader causes the strap portions thereat to cross at substantially a right angle. In the present instance, the sides 34 and 35 of the member 31 are substantially square, and either said side may be utilized, if desired, for the mounting of a license plate thereat, or have printing thereon to provide a name or other identity plate.

Figure 9 discloses an alternative keeper or spreader member 37 which may function generally as the member 31. In the present instance, the member 37 comprises a ring portion 38 with an integral bar portion extending diametrically across it. The intersecting portions of the engaged strap 15 may pass over the bar 39 from the same ring side which would preferably be placed nearest the animal wearing the harness whereby to minimize the possible contact of the member with the animal. The member 37 imposes a maximum size of angle at the adjacent loop ends, but permits a smaller angle if such is required for a fit of the harness. It will be understood that the bar 39 might be omitted, in which case the different strap portions at the remaining ring would enter the ring from opposite sides thereof and be bent around each other for cooperatively mounting the ring in its place, each strap portion acting as a cross-bar with respect to the other.

In case the harness strap should be of rounded, rather than rectangular, cross-section, the sliding keeper or spreader would be differently formed. As shown in Figures 10 and 11, a member 41 engages adjacent portions of a round strap 15' at the juncture of its collar and body loops, and provides curved tubular portions 42 at opposite edges of a flat connecting portion 43 which may be integral with the portions 42 as is shown. The portions 42 slidably receive the strap 15' therethrough, and the engaged strap portions are curved to make acute angles with each other at opposite ends of the member, but are parallel at the center of the member.

From a consideration of the disclosed harness and its parts, it will be understood that the present harness structure is particularly simple and pleasing in appearance, yet provides all necessary features and functions in a harness of its type. Thus, the provision of the single required fastening means for the one-piece strap at the top of a loop thereof facilitates the mounting and dismounting of the harness to have an adjusted effective length as a continuous banding element, and permits the further use of the fastener as an attaching connection for a leash. The self-adjustment of the mounted harness to the animal carrying it, and the distribution of the controlling pressure are also seen as important contributions in the art. The present harness is understood to be usable on domesticated and captive animals generally as well as on dogs, as is particularly shown.

In view of the foregoing description, taken in connection with the accompanying drawing, the advantages of the construction and methods of mounting and use of the harness will be readily understood by those skilled in the art to which the invention appertains. While I have described the features and the principle of operation of a structure and its parts which I now consider to be preferred embodiments thereof, I desire to have it understood that the showing is primarily illustrative, and that such changes may be made, when desired, as fall within the scope of the following claims.

I claim:

1. An animal leash harness comprising a single strap of flexible material shaped on an animal to form collar and body loops extending from a common lower point of the loops and relatively free at their tops, and a buckle means releasably securing the strap ends together at the top of a said loop and providing a leash connection thereat.

2. An animal harness comprising a single strap of flexible material shaped on an animal to provide collar and body loops extending from a common lower point thereof and relatively free elsewhere, and a member freely and slidably engaging the strap portions at said common point of the loops to retain the strap portions in angular relation while permitting a variation in the relative sizes of the loops to fit the harness to an animal.

3. An animal leash harness comprising a single strap shaped into collar and body loops extending from a common point thereof which is designed for its disposal opposite the chest of an animal wearing the harness, means releasably securing the strap ends together at the top of a said loop in adjustably overlapped relation, and a member engaging the strap portions at said common point of the loops for their constant free sliding therein to maintain the portions in angular relation while normally permitting independent longitudinal movements of said strap portions whereby the relative sizes of the loops may vary to automatically fit the harness to an animal wearing it.

4. An animal leash harness comprising a single continuous strap shaped when mounted on an animal to provide collar and body loops extending from a common lower point thereof and otherwise relatively free, and a leash connected at the top of only one of said loops and extended in the general plane thereof whereby an upward pull on the leash is arranged to effect a controlling downward pull of the other loop against the portion of an animal engaged by the latter loop.

5. An animal leash harness comprising a single flexible strap of uniform cross-section shaped to provide collar and body loops extending from a common lower point thereof, and a buckle releasably securing the strap ends together at the top of a said loop and having a tongue portion engaged through the strap ends and extending fixedly from a base portion and providing an eye opening beyond the engaged strap portions for receiving the terminal hook of a leash.

6. An animal control harness comprising a single flexible strap shaped on an animal to provide collar and body loops extending from a common lower point thereof, and means releasably securing the strap ends together at the top of a loop and providing an eye extending outwardly from the secured strap portions for connection with a leash.

7. An animal control harness comprising a flexible strap shaped and secured on an animal to provide closed collar and body loops encircling the animal's body respectively before and behind its shoulders and extending from a common point and otherwise relatively unconnected, and means for attaching a leash to a said loop at a point thereof opposite the common point of the loops.

8. The method of utilizing a single strap member to provide a control harness on an animal's body, which comprises forming coterminous closed loops of the strap about the animal's trunk and neck to have a common loop point centrally beneath the animal's body with the loops otherwise relatively free whereby an upward pull on the top of either loop will produce a downward pull of the other loop against the body part encircled thereby.

JOHN L. EVERSON.